United States Patent
Stottlemyer et al.

(10) Patent No.: US 7,924,654 B1
(45) Date of Patent: Apr. 12, 2011

(54) SYSTEM FOR BEAMFORMING ACOUSTIC BUOY FIELDS

(75) Inventors: Thomas R. Stottlemyer, Noank, CT (US); Ira B. Cohen, Waterford, CT (US); James E. Chisum, Honolulu, HI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 245 days.

(21) Appl. No.: 12/287,163

(22) Filed: Sep. 30, 2008

(51) Int. Cl.
*G01S 3/802* (2006.01)
(52) U.S. Cl. ...................................................... 367/119
(58) Field of Classification Search .................. 367/128, 367/5, 119, 121; 342/357.06
See application file for complete search history.

(56) References Cited

U.S. PATENT DOCUMENTS

| | | | | |
|---|---|---|---|---|
| 3,783,441 A | * | 1/1974 | Slawsky | 367/128 |
| 4,639,900 A | * | 1/1987 | Gustafson | 367/128 |
| 4,673,363 A | * | 6/1987 | Hudson et al. | 441/1 |
| 2006/0241914 A1 | * | 10/2006 | Barnard et al. | 702/189 |
| 2008/0165617 A1 | * | 7/2008 | Abbot et al. | 367/131 |

* cited by examiner

*Primary Examiner* — Dan Pihulic
(74) *Attorney, Agent, or Firm* — James M. Kasischke; Michael P. Stanley; Jean Paul A. Nasser

(57) ABSTRACT

A system using beamforming techniques in conjunction with an active or passive acoustic buoy field, where the buoy field has a plurality of buoys, each buoy employing at least one sensor attached to and extending substantially downward from that buoy so as to form a planar or conformal array. Each array buoy uses highly accurate GPS tracking devices to locate that buoy's array sensor position relative to all other buoy arrays in the known buoy field. This accurate positional data is used in conjunction with the sensor data from each depth to beamform a planar or a volumetric array.

14 Claims, 2 Drawing Sheets

SYSTEM FOR BEAMFORMING ACOUSTIC BUOY FIELDS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to information processing of data signals from ocean deployed acoustic buoy fields and more specifically to a system for improving the detection, classification and localization of undersea vehicles such as submarines, UUVs and the like using beamforming techniques on data from active and passive free floating acoustic buoys deployed in the ocean.

(2) Description of the Prior Art

A field of sonar buoys is often deployed at sea in order to acoustically detect, classify and localize the position of undersea vehicles. These buoys may be passive receivers or may be capable of receiving active acoustic transmissions in a bistatic or multistatic configuration. To-date, the usefulness of such buoy fields has been limited by the individual performance of each omnidirectional buoy.

FIG. 1 shows a prior art towed linear receiver array 10. Towed array 10 includes a linear series of hydrophones 12 sequentially attached to a central cable 14. Hydrophones 12 and cable 14 are enclosed within a hose 16 which is in turn filled with oil 18. A tow cable 20 is fixedly attached to one end of array 10 in order to pull the array through the water in the generally horizontal direction of tow 22. Well known line array beam forming techniques are used on the data from the array of hydrophones so as to achieve array gain and improve detection, localization and classification performance.

FIG. 2 shows a prior art volumetric towed array configuration 40 including a plurality of the towed arrays 10 of FIG. 1. Arrays 10 are fixedly attached in spaced apart relationship to a common tow body 42 so as to stream horizontally in parallel behind the moving tow body. The other end of tow body 42 attaches to tow cable 20 which pulls configuration 40 in the direction of tow 22. Multi-line linear towed array beamforming is then utilized to extract even more target location information than the single towed array of FIG. 1.

The prior art towed hydrophone arrays described above, while accurate in target detection, require tow induced movement in order to remain in a known horizontal plane. Other fixed sensor array types such as planar, spherical and cylindrical have known relative element spacing thereby permitting use of well known beamforming techniques for accurate target location. Stationary buoy fields on the other hand do not presently experience the benefits of such tow movement or fixed volumetric spacing.

What is needed is a way to make better use of the data collected from the multiplicity of stationary or slowly drifting acoustic sonar buoys deployed over a pre-selected ocean surface area, with each buoy having one or more sensors extending vertically downward from the underside of the buoy.

SUMMARY OF THE INVENTION

It is a general purpose and object of the present invention to provide improved signal processing of the received acoustic information generated by the sensors of a deployed sonar buoy field.

It is a further object to employ conformal array beamforming techniques on the received buoy field sensor signal data.

Another object is to employ vertical strings of sensors for each buoy to permit generation of spatial information that enables volumetric detection of undersea vehicles, preferably modeled on the configuration of a cylindrical array.

Yet another object is to provide a system that produces more accurate undersea vehicle position information by combining highly accurate Global Positioning System (GPS) buoy position location information for each buoy together with line array sonar data from that buoy as input to remotely located beam forming electronics.

These objects are accomplished with the present invention by providing a system using well known beam forming techniques in conjunction with an active or passive acoustic buoy field, where the buoy field has a plurality of buoys, each buoy employing at least one sensor attached to and extending substantially downward from that buoy so as to form a planar or conformal array. Each array buoy uses highly accurate GPS tracking devices to locate that buoy's array sensor position relative to all other buoy arrays in the buoy field. This accurate positional data is used in conjunction with the sensor data from each depth to beamform a planar or a volumetric array.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

With reference to the above described drawings wherein like numerals represent like parts throughout the several figures, there is shown a system for beamforming the transmitted outputs of an array of acoustic sonar buoys in accordance with the present invention.

Figure 1:
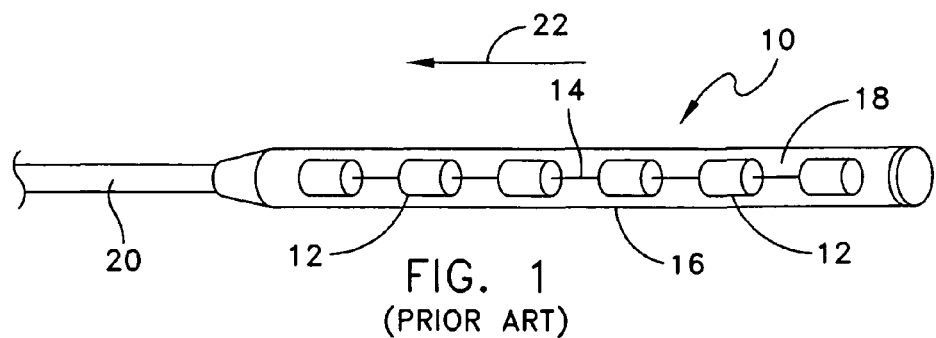
FIG. 1 shows a typical prior art towed linear hydrophone array.
Figure 2:
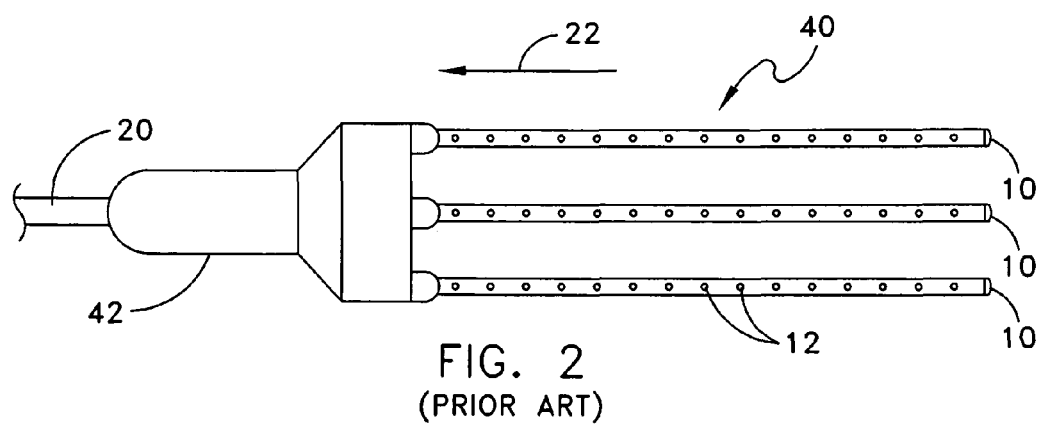
FIG. 2 shows a typical prior art deployment of multiple parallel linear hydrophone arrays towed in spaced apart relationship, the information obtained from which is beamformed so as to form a volumetric receiver array output.
Figure 3:
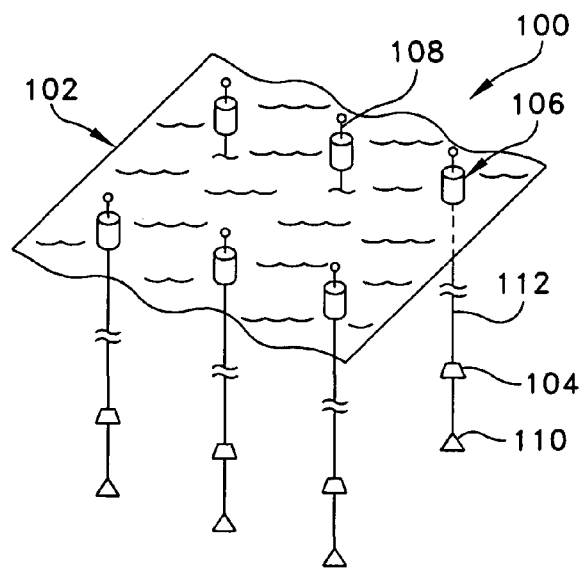
FIG. 3 shows a beam forming sonar buoy system according to the teachings of the present invention having a deployed field of acoustic signal receiving buoys, each employing a single sensor per buoy.

FIG. 3 shows a field of active or passive sonar buoys, generally identified as 100, floating on ocean surface 102 with a single sensor 104 deployed in the ocean below each buoy 106 at a preselected depth. Sensor 104 may be passive, i.e. a hydrophone, or an active transmit/receive device. Buoy 106 has an antenna 108 affixed to and positioned on top of the buoy above the water line. Sensor 104 also has an attached weight 110 hanging below the sensor in order to ensure substantial verticality of the sensor position beneath the buoy. Sensor 104 and weight 110 are connected to the underside of buoy 106 by cable 112. Cable 112 is of as type well known in the art and includes both strength members and electrically conductive members.

Figure 4:
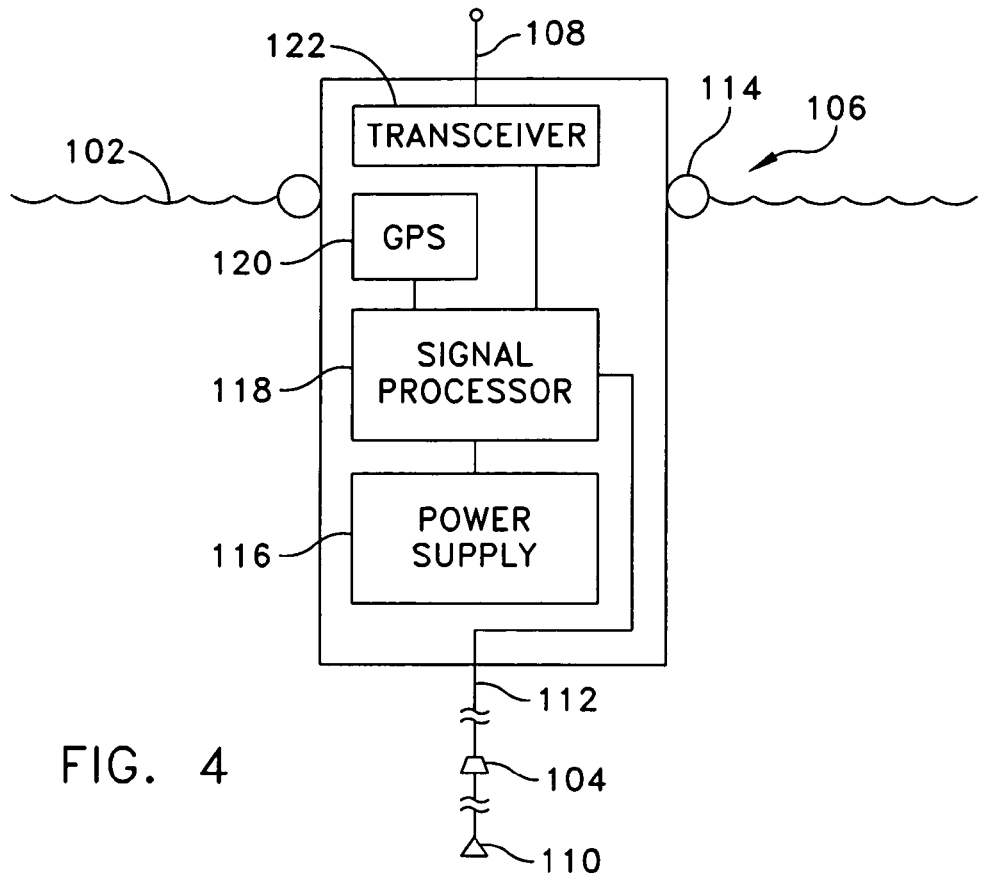
FIG. 4 shows a detailed block diagram of a typical sonar buoy configuration according to the teachings of the present invention.

FIG. 4 shows additional details of sonar buoy 106. Buoy 106 includes a flotation apparatus generally shown as collar 114 although other internal positive buoyancy devices may be used if desired. Also included within buoy 106 are a power supply 116, signal processor 118, a GPS locating device 120 and a transceiver 122. GPS locating device 120 can have its own antenna, or it may use antenna 108. Transceiver 122 is connected to antenna 108 for transmitting and receiving signals associated with remote beamforming to a ship, an aircraft or a land-based facility. Power supply 116 is connected to signal processor 118, and power from supply 116 is distributed by signal processor 118 to connected GPS device 120, connected transceiver 122 and, via cable 112, to sensor(s) 104.

When operated individually each single sensor buoy 106 produces an omnidirectional acoustic beam pattern which provides little or no directional gain. By knowing the exact location of each of the buoys in the field via the GPS device, data from the entire field of buoys 106 can be processed together as a system to form beams that increase acoustic performance significantly in a manner similar to a fixed multi-sensor array. The generated beams can be steered using any means known to determine the range and direction of undersea vehicles such as submarines. The shapes of the beams can also be reconfigured by optimally turning certain buoys on or off. This beam reconfiguration technique provides the ability to "null" certain directions if, for example, there is unwanted ambient noise on a particular bearing.

In order to more closely determine the precise location of the buoys in the field, it may be necessary to run well known optimization algorithms, using the GPS device determined positions as the starting points for the optimization. Examples of such algorithms are the "Method of Feasible Directions" or the "Broydon-Fletcher-Goldfarb-Shanno (BFGS) Variable Metric Method" although other optimization algorithms may be used without deviating from the teaching of the present invention. In addition, the buoys in the field are time-synched to keep their clocks within 1/10 of a wavelength (e.g., 0.2 msec for a 500 Hz wavelength) for beamforming accuracy purposes.

Figure 5:
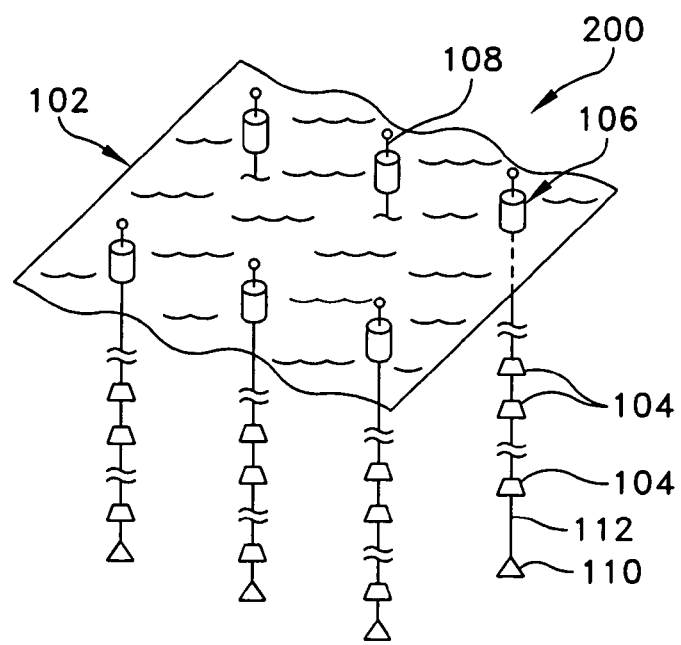
FIG. 5 shows the beam forming sonar buoy field system of FIG. 3 with each buoy having a plurality of vertically disposed sensors extending downward therefrom.

FIG. 5 depicts a system according to the present invention employing a multi-sensor array field 200 of buoys 106, each buoy having a plurality of hydrophone sensors 104 deployed vertically downward from buoy 106 to a preselected depth that can be up to 1000 feet, each sensor string being held vertical by weight 110. Sensors 104 and weight 110 are connected by cable 112 to form the vertical array. In this configuration, the beamforming is performed on a volumetric array of sensors, which provides even more directional gain (e.g., in depression and elevation) than the planar array produced by the single sensors of FIG. 3. The volumetric array provides the ability to not only determine the range and distance to an undersea vehicle, but also the vehicle's depth in the water column. As described for the implementation of FIG. 3, sensors could also be optimally turned on or off in order to create acoustic nulls in directions of high ambient noise.

Any standard volumetric array beamforming technique can be used, the only adjustments required being those needed to account for the initial buoy separation, lateral-longitudinal movement (drift) of each buoy supported string in the ocean, and the vertical motion of the entire string due to wave produced surface motion. Any small GPS device, like those manufactured by Garmin for example, is placed inside a buoy 106 to accurately determine sensor position. GPS devices are now manufactured for use in wrist watches and bicycles in addition to automobile navigation systems, so present devices are very small, highly accurate, and widely available. A specialized GPS device having higher accuracy can be used for this, as well.

While the present invention can beamform multiple elements on multiple buoys in any volumetric configuration, the preferred embodiment uses a method similar to the beamforming of a cylindrical array. That is, when beamforming a cylindrical hull array on a ship, the number of acoustic sensors and the exact position of each of the sensors needed to form acoustic beams is known. The present invention treats the buoy string sensors like the sensors of a cylindrical array, and utilizes a technique that beamforms the output of each of the individual buoy sensors in order to form acoustic beams from a distributed field of floating buoys. The invention has separate free floating line arrays, which can be very widely spaced initially or even repositioned, with position accurately determined using GPS devices. Having the ability to form acoustic beams using combinations of the individual sensors in each of the buoy arrays further improves USW capabilities.

The primary advantage of the present invention is that it provides significant performance gains over existing sonar buoy field target detection methods. The ability to form beams using planar or volumetric arrays of sensors has been used for decades, but not for buoy fields deployed in the ocean due to difficulty in accurately knowing the relative real time spacing of the buoys in the field and each sensor's vertical position. The present invention significantly improves the detection, classification and localization of undersea vehicles using sonar buoy fields.

What has thus been described is a system using well known beamforming techniques in conjunction with an active or passive acoustic buoy field, where the buoy field has a plurality of buoys, each buoy employing at least one sensor attached to and extending substantially downward from that buoy so as to form a planar or conformal array. Each array buoy uses highly accurate GPS tracking devices to locate that buoy's array sensor position relative to all other buoy arrays in the known buoy field. This accurate positional data is used in conjunction with the sensor data from each depth to beamform a planar or a volumetric array.

Obviously many modifications and variations of the present invention may become apparent in light of the above teachings. For example: the number of buoys, the horizontal spacing between buoys and the number of and vertical spacing between sensors attached to a buoy can be varied for the particular application. In some cases a sparse buoy field, which provides wide beams may be desired for simple searches. In other cases, a dense buoy field with numerous closely spaced vertical hydrophones, thereby providing narrow beams, may be desired for precise localization. GPS or RF position location devices may be used to localize, although GPS devices are preferred. The signal processing for the present sonar buoy field beamforming implementation could take place on a buoy that is placed among the other buoys in the field, on board a ship that is involved in the operation of the deployed buoys, aboard aircraft or at a land-based facility connected via a satellite link.

In light of the above, it is therefore understood that within the scope of the appended claims, the invention may be practiced otherwise than as specifically described.

What is claimed is:

1. A system for beamforming an ocean deployed acoustic buoy field, the system comprising:

a plurality of acoustic sonar buoys, disposable in a spaced apart relationship on the surface of the ocean, for providing a buoyant sensor field for the ocean deployed portion of said system;

a plurality of underwater sound sensing means, one each said sensing means being fixedly attached to a corresponding sonar buoy, each said sensing means being disposable in the ocean below said corresponding buoy, for obtaining acoustic signals;

a plurality of position locating devices, one each being included with a corresponding sonar buoy, for providing accurate relative position data for that buoy with respect to said buoy field;

a plurality of transceivers, one each included with a corresponding sonar buoy joined to underwater sound sensing means and position locating devices joined to said buoy, capable of transmitting acoustic data signals and positional data to a remote location; and a remote receiver, having beamforming electronics capable of receiving said relative position data and said acoustic data from at least two of said plurality of transceivers and processing said data by beamforming said received acoustic data utilizing said relative position data from at least two of said plurality of transceivers so as to steer acoustic beams formed from said acoustic data.

2. The system of claim 1 wherein each said acoustic sonar buoy further comprises:

a sealable housing, having an interior cavity and an exterior surface;

flotation means, affixed to said sonar buoy, for providing positive buoyancy to said buoy;

a power supply, disposed inside said housing, for providing electric power to operate said sonar buoy;

a signal processor, disposed inside said housing and connected to said power supply, said sound sensing means, said position locating device and said transceiver, said signal processor distributing power through said sonar buoy and also to said sound sensing means, for processing received underwater sounds and said relative buoy position data and sending said data to said transceiver; and antenna means, affixed to the top of said housing and connected to said transceiver, for transmitting said data to said remote receiving means.

3. The system of claim 2 further comprising a plurality of weights, one each attached to the bottom of each sound sensing means, for keeping said sound sensing means extended downward substantially vertical in the ocean.

4. The system of claim 3 wherein each said sound sensing means further comprises a single hydrophone, said beamforming electronics being capable of combining said plurality of single hydrophone generated data to form a planar array.

5. The system of claim 3 wherein each said sound sensing means further comprises a linear array of hydrophones, said beamforming electronics being capable of combining said plurality of hydrophone array generated data to form a volumetric array.

6. A system for beamforming an ocean deployed acoustic buoy field, the system comprising:

a plurality of acoustic sonar buoys, disposable in a spaced apart relationship on the surface of the ocean, for providing a buoyant sensor field for the ocean deployed portion of said system;

a plurality of underwater sound sensing means, one each said sensing means being fixedly attached to a corresponding sonar buoy, each said sensing means being disposable in the ocean below said corresponding buoy, for obtaining acoustic signals;

a plurality of position locating devices, one each being included with a corresponding sonar buoy, for providing accurate relative position data for that buoy with respect to said buoy field;

a plurality of transceivers, one each included with a corresponding sonar buoy joined to underwater sound sensing means and position locating devices joined to said buoy, capable of transmitting acoustic data signals and positional data to a remote location; and a remote receiver, having beamforming electronics capable of receiving said relative position data and said acoustic data and processing said data so as to determine the position of a target;

wherein each said acoustic sonar buoy further comprises:

a sealable housing, having an interior cavity and an exterior surface;

flotation means, affixed to said sonar buoy, for providing positive buoyancy to said buoy;

a power supply, disposed inside said housing, for providing electric power to operate said sonar buoy;

a signal processor, disposed inside said housing and connected to said power supply, said sound sensing means, said position locating device and said transceiver, said signal processor distributing power through said sonar buoy and also to said sound sensing means, for processing received underwater sounds and said relative buoy position data and sending said data to said transceiver; and antenna means, affixed to the top of said housing and connected to said transceiver, for transmitting said data to said remote receiving means; and a plurality of weights, one each attached to the bottom of each sound sensing means, for keeping said sound sensing means extended downward substantially vertical in the ocean;

wherein each said sound sensing means further comprises a linear array of hydrophones, said beamforming electronics being capable of combining said plurality of hydrophone array generated data to form a volumetric array, and said volumetric array is beamformed to be a cylindrical array.

7. The system of claim 4 wherein said position locating device further comprises GPS circuit.

8. The system of claim 6 wherein said position locating device further comprises GPS circuit.

9. The system of claim 7 wherein said remote receiving means is located on a ship.

10. The system of claim 7 wherein said remote receiving means is located on shore.

11. The system of claim 7 wherein said remote receiving means is located on an aircraft.

12. The system of claim 8 wherein said remote receiving means is located on a ship.

13. The system of claim 8 wherein said remote receiving means is located on shore.

14. The system of claim 8 wherein said remote receiving means is located on an aircraft.

* * * * *